US 8,806,487 B2

(12) United States Patent
Zhang et al.

(10) Patent No.: US 8,806,487 B2
(45) Date of Patent: Aug. 12, 2014

(54) CALCULATING VIRTUAL MACHINE RESOURCE UTILIZATION INFORMATION

(75) Inventors: Hui Zhang, Princeton Junction, NJ (US); Haifeng Chen, Old Bridge, NJ (US); Guofei Jiang, Princeton, NJ (US); Kenji Yoshihira, Princeton Junctions, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/246,298

(22) Filed: Sep. 27, 2011

(65) Prior Publication Data

US 2012/0185851 A1     Jul. 19, 2012

Related U.S. Application Data

(60) Provisional application No. 61/432,905, filed on Jan. 14, 2011.

(51) Int. Cl.
*G06F 9/455*     (2006.01)
*G06F 9/50*      (2006.01)

(52) U.S. Cl.
CPC .... *G06F 9/45558* (2013.01); *G06F 2009/4557* (2013.01); *G06F 9/5083* (2013.01)
USPC .......................................................... 718/1

(58) Field of Classification Search
None
See application file for complete search history.

(56) References Cited

U.S. PATENT DOCUMENTS

| | | | |
|---|---|---|---|
| 2006/0200819 A1* | 9/2006 | Cherkasova et al. | 718/1 |
| 2010/0082320 A1* | 4/2010 | Wood et al. | 703/22 |

OTHER PUBLICATIONS

Gupta, D., et al. "Enforcing Performance Isolation Across Virtual Machines in Xen" Middleware 2006, ACM/IFIP/USENIX 7th International Middleware Conference. May 2006. (21 Pages).

Lu, L., et al. "Untangling Mixed Information to Calibrate Resource Utilization in Virtual Machines" 8th International ACM Conference on Autonomic Computing (ICAC '11). Jun. 2011. (10 Pages).

Wood, T., et al. "Profiling and Modeling Resource Usage of Virtualized Applications" Middleware 2008, ACM/IFIP/USENIX 9th International Middleware Conference. Dec. 2008. pp. 366-387.

* cited by examiner

*Primary Examiner* — Emerson Puente
*Assistant Examiner* — Sisley Kim
(74) *Attorney, Agent, or Firm* — Joseph Kolodka

(57) ABSTRACT

A system and method are provided for estimating physical resource utilization information for virtual machines. The system includes a model which indicates how virtual resource activities are transformed into physical resource activities for each virtual machine running on a server. A run-time calibrator utilizes the model to estimate physical resource utiliation information for each individual virtual machine on the server.

9 Claims, 4 Drawing Sheets

CALCULATING VIRTUAL MACHINE RESOURCE UTILIZATION INFORMATION

RELATED APPLICATION INFORMATION

This application claims priority to provisional application Ser. No. 61/432,905 filed on Jan. 14, 2011, the entirety of which is incorporated herein by reference.

BACKGROUND

1. Technical Field

The present invention relates to estimating virtual machine resource utilization information, and more particularly, to estimating physical resource utilization information for individual virtual machines running on a server.

2. Description of the Related Art

Collecting accurate virtual machine (VM) resource utilization information is important for performing a variety of management tasks. For example, when provisioning resources, resource utilization information is used as the basis for sizing virtual machines. For overload management tasks, virtual machine resource utilization information is used to select virtual machines which are to be migrated to another server, as well as the target servers which are to receive the virtual machines. For power management tasks, virtual machine resource utilization information is used to consolidate virtual machines. As another example, for application management, performance modeling uses resource utilization information to build the relationship between application performance and resource demand.

Unfortunately, resource virtualization and multiplexing operations present a number of issues which make it difficult for information technology (IT) systems to obtain accurate virtual machine resource utilization information. One particular problem relates to profiling physical resource utilization for individual virtual machines.

The profiling problem is difficult for several reasons. Difficulties arise because the virtual-to-physical (V2P) resource activity mapping is not always one-to-one, and may depend on the characteristics of the application workload. Other complications stem from the cross-resource utilization causality among different resources (e.g., CPU, memory, disk I/O, network, etc.) associated with virtualization and multiplexing operations which occur when virtual machines are being consolidated. Furthermore, the problem becomes even more difficult when the actual resource demand of the virtual machines is hidden due to a server overload on physical resources.

SUMMARY

In accordance with the present principles, a system is disclosed for estimating physical resource utilization information for virtual machines. The system includes a model which indicates how virtual resource activities are transformed into physical resource activities for each virtual machine running on a server. A run-time calibrator utilizes the model to estimate physical resource utilization information for each individual virtual machine on the server.

In accordance with the present principles, a method is disclosed for estimating physical resource utilization information for virtual machines. The method includes constructing a model which indicates the manner in which virtual resource activities are transformed into physical resource activities for each virtual machine running on a server. Using the model, physical resource utilization information is estimated for each individual virtual machine on the server using the model In accordance with the present principles, another system is disclosed for estimating physical resource utilization information for virtual machines. At least one directed factor graph indicates how virtual resource activities are transformed into physical resource activities for each virtual machine running on a server. A run-time calibrator is configured to estimate physical resource utilization information for each individual virtual machine on the server and modify the at least one directed factor graph upon detecting certain changes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
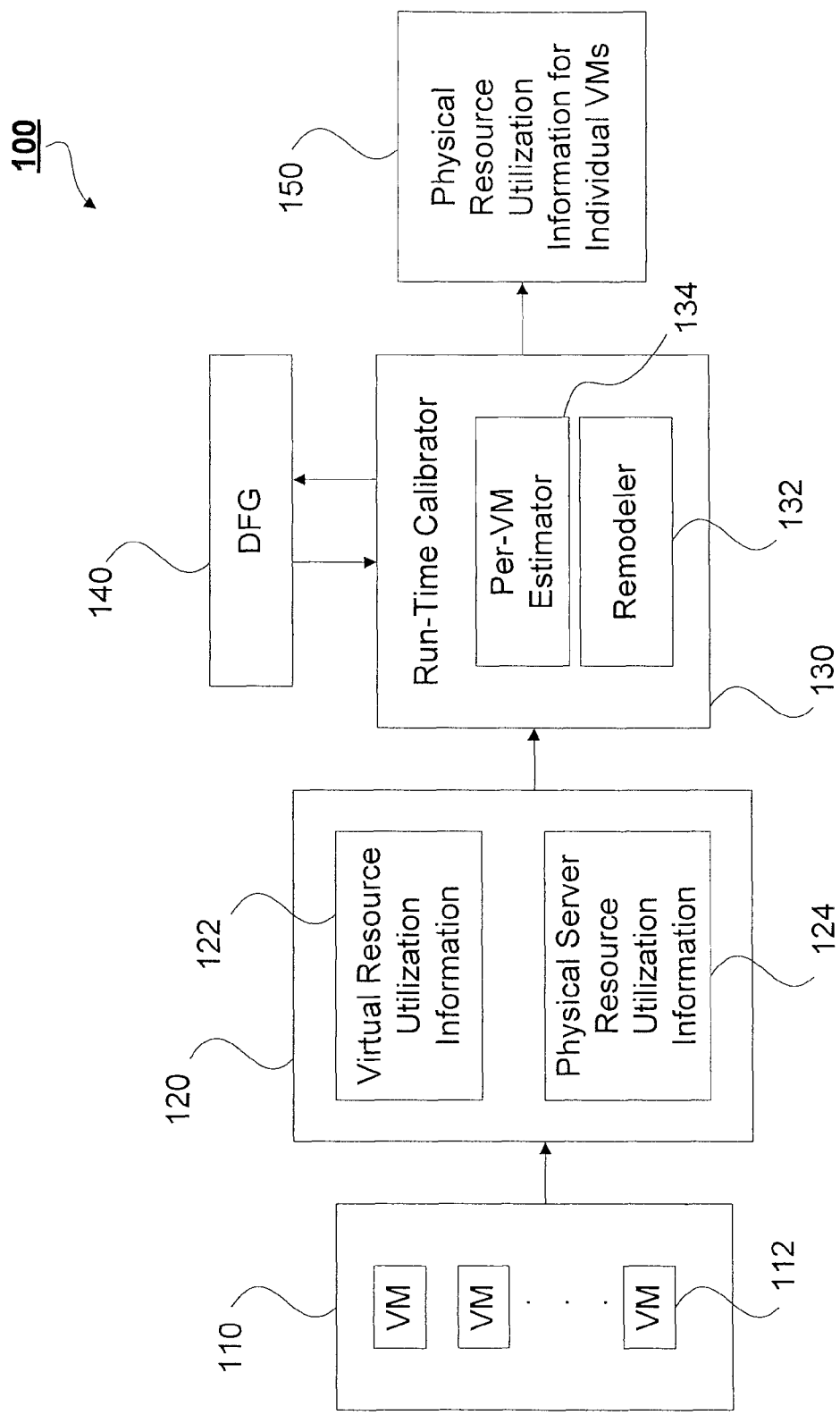
FIG. 1 is a block/flow diagram illustrating a system for estimating physical resource utilization information for individual virtual machines in accordance with an embodiment of the present principles.

In accordance with the present principles, a resource management scheme in a virtualized data center is provided for calculating physical resource utilization information for individual virtual machines (VMs). Providing accurate estimations regarding resource utilization information is important for performing a variety of management tasks in a virtualized data center (e.g., resource provisioning, overload management, power management, application management, etc.). When implementing these management tasks, certain decisions may be based on the virtual machine resource utilization information (e.g., information indicating the usage of CPU, memory, network, disk, etc.).

In one embodiment, a base model (e.g., a directed factor graph) may be constructed which embodies the dependencies among resources across virtual and physical layers. Using this model, a run-time calibration procedure estimates physical resource utilization information for individual virtual machines (referred to herein as "per-VM physical resource utilization information"). The information output by the calibration procedure indicates the quantity of physical resources consumed or utilized by each virtual machine running on a server. For example, the information may indicate the physical utilization of the CPU (e.g., utilization in terms of CPU cycles), memory (e.g., utilization in memory size), network (e.g., utilization in traffic volume), or disk (e.g., utilization in disk I/O or network storage traffic) for each virtual machine running on a server.

Furthermore, the calibration procedure can modify the base model to adapt to the dynamics of the system. The remodeling procedure may be triggered if certain conditions or criteria are satisfied. For example, in one embodiment, the per-VM physical resource utilization information for each of the individual virtual machines is summed together to provide an estimate of the overall physical resource utilization of a server. This estimated server resource utilization information is then compared to resource utilization information which was collected directly from the server. If the discrepancy between the two values is larger than a specified threshold, the remodeling procedure is triggered. In this manner, the system can adapt to the dynamics of the system.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram illustrates a system 100 for estimating physical resource utilization information for individual virtual machines in accordance with an embodiment of the present principles.

The system 100 includes a server 110 running a plurality of virtual machines 112. The run-time calibrator 130 includes a per-VM estimator 134 which generates calibrated data 150 indicating the physical resource utilization for each individual virtual machine 112 running on the server 110. The run-time calibrator 130 uses resource utilization information 120, which is collected from the virtual machines 112 and the host server 110, as well as the directed factor graph (DFG) 140 to estimate or calculate the calibrated data 150.

The DFG 140 utilized by the run-time calibrator 130 models the multivariate dependence relationships among different resources across virtual and physical layers. The DFG 140 indicates the signal transformation and aggregation processes associated with providing a virtual platform on top of a set of physical resources. Hence, the DFG 140 can indicate the manner in which virtual resource activities are transformed into physical resource activities for each virtual machine, and how the physical resource activities for each virtual machine are aggregated together to determine the total physical resource activities of the server 110. The run-time calibrator 130 is able to analyze and utilize this information embodied in the DFG 140 to determine the physical resources which are consumed by each individual virtual machine 112 running on the server 110.

A more detailed description regarding the implementation of the DFG 140 is provided below with reference to FIG. 2.

As mentioned above, the run-time calibrator 130 also receives resource utilization information 120 from the server 110 as an input. The resource utilization information 120 may include virtual resource monitoring information 122 and physical server resource utilization information 124. The virtual resource monitoring information 122 represents data observable from within the virtual machines 112 by the guest operating systems of the virtual machines 112. The virtual resource monitoring information 122 may be collected by the system activity reporter (SAR) utility tool in the LINUX operating system (OS). Alternatively, in the monitoring framework provided by Xen, this information 122 can be obtained via the virtual machine monitor (VMM) located in the guest operating system which is designated "domain0" (or "domain0").

The virtual resource monitoring information 122 collected may include the following information:

(1) CPU Usage: the percentage of time that a guest OS uses the CPU within a specified time interval.

(2) Memory Usage: the percentage of used memory within a specified time interval, i.e., is the ratio of memory usage by the VM and the total memory assigned to the domain.

(3) Disk Usage: four different metrics may be utilized:
(a) wtps—the total number of write requests per second issued to the privileged "dom0";
(b) bwrtn/s—the total amount of data written to a virtual block device (VBD) in blocks per second;
(c) rtps—the total number of read requests per second issued to dom0;
(d) bread/s—the total amount of data read from a VBD in blocks per second.

(4) Network Usage: four different metrics may be utilized:
(a) rxpck/s—the total number of packets received per second;
(b) txpck/s—the total number of packets transmitted per second;
(c) rxbyt/s—the total number of bytes received per second;
(d) txbyt/s—the total number of bytes transmitted per second.

On the other hand, the physical server resource utilization information 124 includes data indicating the total usage of physical resources by a server 110. Once again, this information 124 may be collected by the virtual machine monitor of "dom0" in Xen. The physical server resource utilization information 124 may include the following information:

(1) CPU Usage: the percentage of time the CPU is consumed by the privileged domain within a specified time interval.

(2) Memory Usage: the ratio of memory usage in the privileged domain and total memory in privileged domain.

(3) Disk Usage: the same four types of read and write metrics discussed above for the virtual disks may also be utilized on physical disks. In the privileged domain (i.e., "dom0") of Xen, this data is available in "/sys/devices/xen-backend/vbd-<domid>-<devid>/statistics/" for virtual block devices.

(4) Network Usage: The same four types of network traffic metrics discussed above for the virtual network cards may also be determined on physical network cards. In the privileged domain of Xen, this data is available in file "/proc/net/dev" for virtual network devices.

The above-described resource utilization information 120 is input to the run-time calibrator 130. The per-VM estimator 134 uses the resource utilization information 120 and the information embodied in the DFG model 140 to estimate and output per-VM resource utilization information 150. The per-VM resource utilization information 150 indicates the physical resources utilized by each individual virtual machine 112 running on the server 110. In one embodiment, the per-VM physical resource information 150 indicates the following information within a specified time interval: (1) utilization of the CPU for each virtual machine 112 in terms of CPU cycles; (2) utilization of memory for each virtual machine 112 in terms of memory size (e.g., in bytes); (3) utilization of the network for each virtual machine 112 in terms of traffic volume; and (4) disk utilization for each virtual machine 112 in terms of disk I/O or network storage traffic.

To permit the system 100 to adapt to dynamics changes which occur during run-time, the run-time calibrator 130 also includes a remodeler 150. Changes in the relationship between a virtual resource activity and its overhead on physical resources may vary and depend on the workload content (e.g., may vary the mapping of the virtual I/O and physical I/O activities). The remodeler 130 can recognize these changes and update the DFG 140 accordingly to account for these changes.

The remodeler 150 may be triggered to update the DFG 140 when certain criteria or conditions are satisfied, or when certain discrepancies are detected between variables. In one embodiment, the data 150 output by the run-time calibrator 130 is summed together for each virtual machine 112 to estimate the overall physical resource utilization on the server 110. For example, the estimated physical CPU utilization for each virtual machine can be added together to estimate the overall CPU utilization of the server. Likewise, the estimated physical network utilization for each virtual machine can be added together to estimate the overall network utilization for the virtual machines.

The aggregated estimates can then be compared to physical server resource utilization data 124 which was collected from the server 110. For example, as explained above, the physical server resource utilization data 124 may include data which indicates the total CPU usage or total memory usage on the server 110. The aggregated estimates can be compared to this information. If the discrepancy between the two values is larger than a specified threshold, the remodeling procedure can be triggered.

Upon triggering the remodeler 150, the remodeler 150 may employ a guided regression model to recalculate the functions in the DFG 140, as well as the corresponding values of the nodes in the DFG 140. In this manner, the system can adapt to the dynamics of the system.

It is pointed out that the system 100 in FIG. 1 can be altered or supplemented in a number of different ways without departing from the present principles. For example, while the system in FIG. 1 is depicted as including a single server 110, it should be recognized that the system 100 may include any number of servers 110 and each server 110 can execute any number of virtual machines 112. Moreover, the resource utilization information 120 which is collected from the server 110 and input to the run-time calibrator 130 may comprise additional information, other than the virtual resource utilization information 122 and physical resource utilization information 124 described above, and this additional information can also be used in the decision-making process of the run-time calibrator 130. Further modifications can also be applied to the system 100 of FIG. 1.

Figure 2:
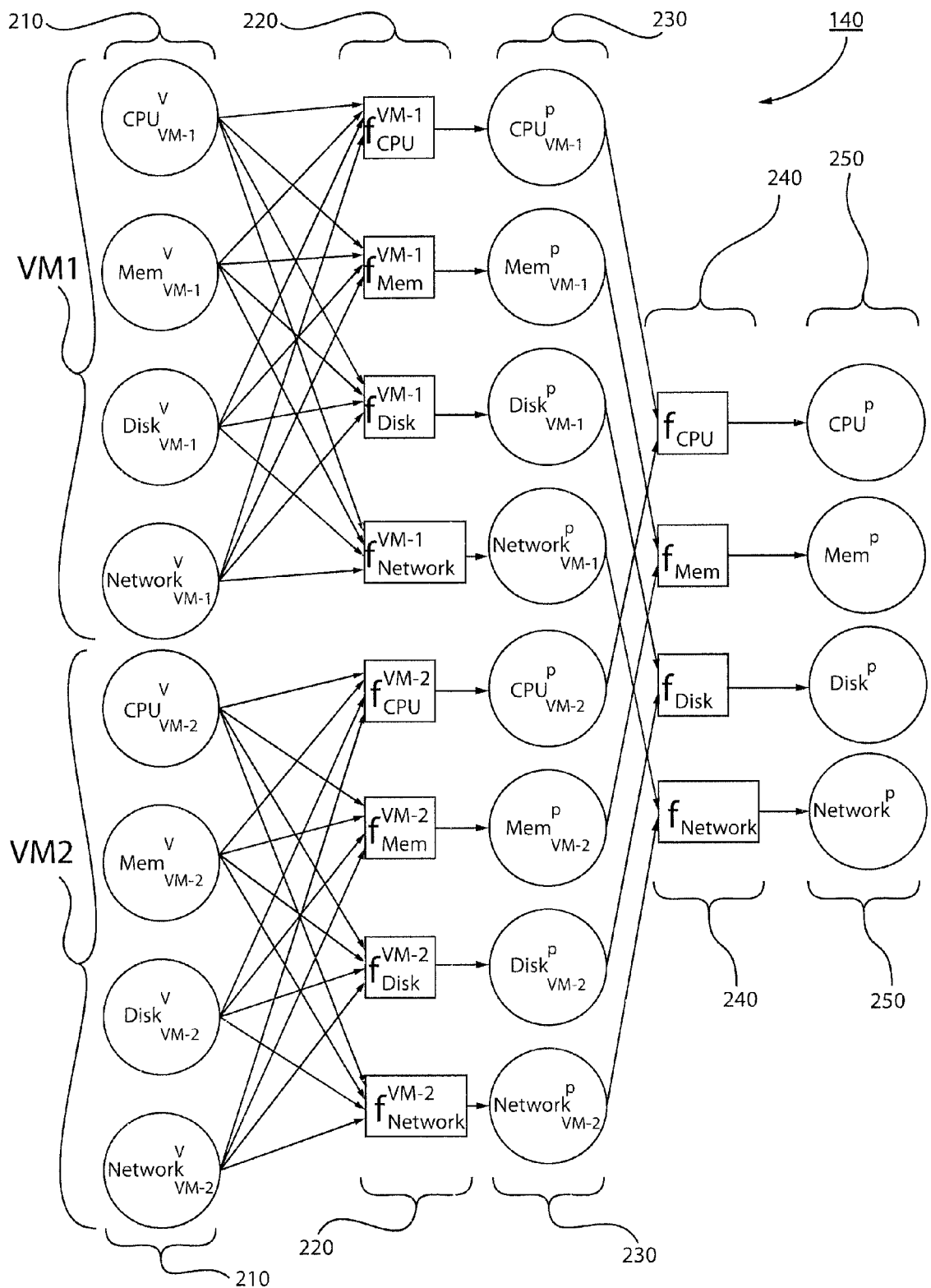
FIG. 2 is a directed factor graph illustrating dependencies among different resources across virtual and physical layers in accordance with an embodiment of the present principles.

Moving on to FIG. 2, an exemplary directed factor graph 140 illustrates dependence relationships among different resources across the virtual and physical layers. The notion of a directed factor graph, such as the DFG 140 in FIG. 2, can be formally defined as follows:

Directed Factor Graph: a directed factor graph (DFG) is a bipartite diagraph G=(V, F, E). V and F are two disjoint node sets. V is used to represent the set of variables, and F is used to represent the set of functions in a modeling process. One edge x->f in E connects a vertex x in V to one vertex f in F when x is an input parameter of the function represented by f. One edge f->y in E connects a vertex f in F to one vertex y in V when y is an output parameter of the function represented by h.

The DFG depicted in FIG. 2 may serve as an initial base model for the calibration process. The DFG 140 includes two virtual machines, VM1 and VM2, running on a server 110. From left side to right side, the virtual resource activities of the virtual machines 112 are first transformed into the physical resource activities, and then the physical resource activities are aggregated to estimate the total physical resource activities of the server 110.

The left-most variable nodes 210 (e.g., $CPU_{vm-1}^v$, $Mem_{vm-1}^v$, $Disk_{vm-1}^v$ and $Network_{vm-1}^v$) represent the virtual resource utilization information 122 which is collected from the virtual machines 112 on the server 110 and input to the run-time calibrator 130. The right-most variable nodes 250 (e.g., $CPU^p$, $Mem^p$, $Disk^p$ and $Network^p$) represent estimates of the total server resource utilization information. Hence, nodes 250 indicate the sum total of all physical resource activities on the server 110. For example, $CPU^p$ represents the total estimated CPU utilization on the server 110, while $Mem^p$ represents the total estimated memory utilization on the server 110.

The intermediate variable nodes 230 e.g., $CPU_{vm-1}^p$, $Mem_{vm-1}^p$, $Disk_{vm-1}^p$ and $Network_{vm-1}^p$) indicate the physical consumption of resources for each particular virtual machine 112. For example, $CPU_{vm-1}^p$ represents the estimated CPU utilization of the virtual machine VM1, and $Disk_{vm-2}^p$ represents the estimated disk utilization of the virtual machine VM2. The values of the intermediate nodes 230 represent the per-VM physical resource information 150 which is calculated by the per-VM estimator 134 in FIG. 1. Conventional systems are not able to accurately compute this information.

The DFG 140 includes two different sets of functions. The functions 220 on the left side of the DFG 140 (e.g., $$f_{cpu}^{vm-1}, f_{Mem}^{vm-1}, f_{Disk}^{vm-1} \text{ and } f_{Network}^{vm-1}),$$

which are situated between the left-most nodes 210 and the intermediate nodes 230, transform virtual resource activities into physical resource activities, thus generating the per-VM physical resource utilization information 150. If the remodeler 132 is triggered in response to system changes (e.g., changes in workload), the remodeler 132 can modify these functions accordingly to adapt to these changes.

The second set of functions 240 (e.g., $f_{cpu}$, $f_{Mem}$, $f_{Disk}$ and $f_{Network}$), located on the right side of the DFG 140, aggregate the physical resource activities of all virtual machines 112 on the server 110. For example, as explained above, $CPU^p$ may represent the total CPU utilization of all virtual machines 112 running on the server 110.

In one embodiment, the remodeler 132 compares the physical server resource utilization information 124 collected directly from the server 110 with the aggregated estimates (e.g., $CPU^p$, $Mem^p$, $Disk^p$ and $Network^p$) represented by the right-most nodes 250. If the discrepancy between the two values exceeds a predetermined threshold value, the remodeler 132 may be triggered to modify the DFG 140. Modifying the DFG 140 may include remodeling the functions, remodeling the functions for a particular resource, or remodeling all of the functions 220 on the left side of the DFG 140. Modifying the DFG 140 may also include recalculating the intermediate nodes 230 and the estimated, aggregated resource values in the right-most nodes 250.

To build a directed factor graph, such as the DFG model 140 in FIG. 2, different micro-benchmark and benchmark applications may be run in a guest domain to generate workloads on each virtualized resource separately. Thus, a DFG 140 may be comprised of a set of DFG sub-graphs built separately on each resource.

In accordance with one embodiment, the methodology for generating a DFG may comprise the following steps:
(1) hosting a single VM in a server;
(2) running a benchmark intensive on a specific virtual resource (e.g., CPU-intensive, network-intensive);
(3) applying statistics analysis to find out the set of physical resources the benchmark incurs non-ignorable utilization; and
(4) applying statistics analysis to learn the base model of the functions (e.g., $$f_{cpu}^{vm-1}, f_{Mem}^{vm-1}).$$

A linear regression model may be utilized to approximate the functions which transform virtual resource activities into physical resource activities (e.g., $$f_{cpu}^{vm-1}, f_{Mem}^{vm-1},$$

etc.). Let the monitoring data be D=[x, y], where $x=[x^{(1)}, x^{(2)}, \ldots x^{(n)}]^T$, $x^{(i)}=[x_1^{(i)}, x_2^{(i)}, \ldots x_p^{(i)}]$ and $y=[y^{(1)}, y^{(2)}, \ldots y^{(n)}]^T$. A linear regression model assumes that the relationship between the dependent variable y and the p-vector of regressors x is approximately linear, and takes the form:

$$y^{(i)} = \beta_1 x_1^{(i)} + \beta_2 x_2^{(i)} + \ldots + \beta_p x_p^{(i)} + \epsilon^{(i)}, i=1, \ldots, n \quad (1)$$

where $\beta=[\beta_1, \beta_2, \ldots, \beta_p]$ are the regression coefficients, and $\epsilon^{(i)}$ is an unobserved random variable that adds noise to the linear relationship between the dependent variable and regressors.

Given the above data set of n statistical units, one approach for solving the above equation is to maximize the following likelihood function:

$$P(y|x, \beta, \sigma^2) \propto (\sigma^2) - \frac{n}{2} \exp\left\{-\frac{\|y - x\beta\|_2^2}{2\sigma}\right\} \quad (2)$$

where $\sigma^2$ represents the noise of the measurement data.

The optimization of Equation 2 leads to the least square solution:

$$\hat{\beta} = (x^T x)^{-1} x^T y. \quad (3)$$

Stepwise regression is applied to the data to reduce the required number of measured variables, and to analyze and remove any co-linearity that might exist between the variables. Stepwise regression uses the same analytical optimization procedure as multiple regression, but differs from multiple regression in that only a subset of predictor variables are selected sequentially from a group of predictors by means of statistical testing of hypotheses. The method calculates the correlations of all the predictor variables with response and selects the variable with the highest correlation to the response as the first variable to enter the regression. Then, at each step, the p value of an F-statistic is computed to test models both with a potential variable and without a potential variable.

If a variable is not currently in the model, the null hypothesis is that the variable would have a zero coefficient if added to the model. If there is sufficient evidence to reject the null hypothesis, the variable is added to the model. Conversely, if a variable is currently in the model, the null hypothesis is that the variable has a zero coefficient. If there is insufficient evidence to reject the null hypothesis, the variable is removed from the model.

Hence, according to one embodiment, the method proceeds as follows:
(1) fit the initial model;
(2) if any variables not in the model have p-values less than an entrance tolerance (that is, if it is unlikely that the variables would have a zero coefficient if added to the model), add the one with the smallest p-value and repeat this step; otherwise, go to step 3;
(3) if any variables in the model have p-values greater than an exit tolerance (that is, if it is unlikely that the hypothesis of a zero coefficient can be rejected), remove the one with the largest p-value and go to step 2; otherwise, end.

The method terminates when no single step improves the model.

Figure 3:
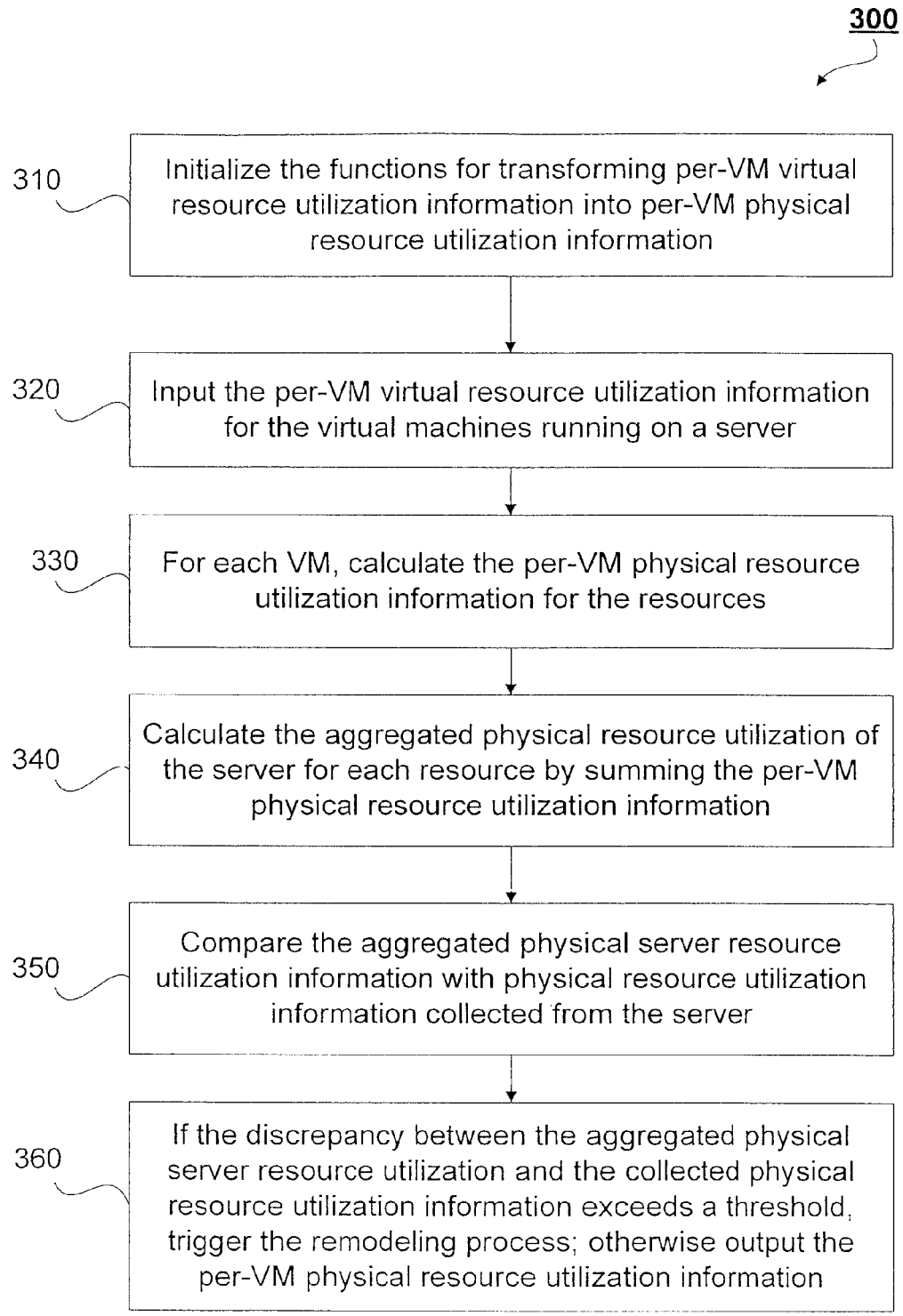
FIG. 3 is block/flow diagram illustrating a method for estimating physical resource utilization for individual virtual machines in accordance with an embodiment of the present principles.

FIG. 3 is block/flow diagram illustrating a method 300 for estimating physical resource utilization for individual virtual machines 112 in accordance with an embodiment of the present principles.

In block 310, the functions for transforming per-VM virtual resource utilization information 122 into per-VM physical resource utilization information 150 are initialized. In the exemplary DFG 140 depicted in FIG. 2, this may include initializing one or more of the function nodes labeled $$f_{cpu}^{vm-1}, f_{Mem}^{vm-1}, f_{Disk}^{vm-1} \text{ and } f_{Network}^{vm-1}.$$

The initial parameter set for the model may be determined using benchmark based profiling, or obtained from offline application-specific profiling for calibrated VMs. While the latter method is expected to give a more accurate model than the former one, it comes with the extra profiling overhead.

Next, the per-VM virtual resource utilization information 122 for the virtual machines 112 running on a server 110 (represented by the left-most variable nodes 210 in FIG. 2) is input to the DFG 140 (block 320). The per-VM virtual resource utilization information 122 may represent data collected from within the operating systems associated with each virtual machine 112, and may indicate the virtual usage of resources.

Utilizing the per-VM virtual resource utilization information 122 and the initialized functions, the per-VM physical resource utilization information 150 for each virtual machine 112 is calculated, e.g., by the per-VM estimator 134 in FIG. 1 (block 330). That is, for each virtual machine, the method calculates the physical resource utilization for each of a plurality of resources (i.e., CPU, memory, network, disk, etc.) The per-VM physical resource utilization information 150 is represented by the intermediate variable nodes 230 in FIG. 2.

Once the per-VM physical resource utilization information 150 is calculated for all virtual machines 112, the per-VM physical resource utilization information 150 is aggregated to determine the total physical resource utilization of the server 110 (block 340). For example, to compute the total CPU utilization of the server 110, the per-VM physical CPU utilization of each virtual machine can be summed together (e.g., $CPU_{vm-1}^p$ and $CPU_{vm-2}^p$ can be summed together in FIG. 2). This can be done for each resource. The right-most variable nodes 250 in FIG. 2 represent the aggregated resource utilization for the server 110.

Next, in block 350, the aggregated physical resource utilization information is compared with the physical server resource utilization information 124 collected directly from the server 110. If the discrepancy between the two values exceeds a predetermined threshold, the remodeling process is triggered to modify the DFG 140 (block 360). Otherwise, the per-VM physical resource utilization information 150 is output.

Block 350 provides a feedback control loop to make the calibration process adaptive to inevitable model dynamics, which may be caused by a change in workload patterns. The relationship between a virtual resource activity and the corresponding overhead on physical resources can vary and may depend on the workload content. The mapping of virtual I/O to physical I/O activities is one such example.

To be robust to transient workload change or monitoring noise, the discrepancy can be calculated on the average of the estimation errors during a sliding window including the past K time points. The threshold can be chosen as $(\epsilon + Z_\alpha * \sigma)$, where $(\epsilon, \sigma^2)$ is the mean and variance of the regression model estimation error from last remodeling process (or those learnt from the benchmark based profiling). $Z_\alpha$ is the α-percentile in statistics. $Z_\alpha$ measures (in terms of estimation accuracy) the probability that the current model performance will resemble the performance profile that was used to build the model. If $Z_\alpha = 3$, α=99.75%, then an estimation error larger than $(\epsilon + 3*\alpha)$ is unlikely (with probability <0.25%) to appear if the virtualization environment remains the same as during the last remodeling process. A large estimation error indicates the change of some factors or parameters in the virtualization environment, and triggers a remodeling process.

The problem becomes more difficult when multiple virtual machines are co-hosted in a single server. In this scenario, the variable y represents a physical resource utilization which is the summation of physical resource utilizations of each virtual machine. Since the physical resource utilizations of individual virtual machines 112 are latent variables, a straightforward regression model may take the format as follows (for m cohosted virtual machines):

$$y^{(i)} = (\beta_1^{VM-1} x_1^{VM-1(i)} + \ldots + \beta_p^{VM-1} x_p^{VM-1(i)}) + (\beta_1^{VM-m} x_1^{VM-m(i)} + \ldots + \beta_p^{VM-m} x_p^{VM-m(i)}) \quad (4)$$

where $y^{VM-j(i)} = (\beta_1^{VM-j} x_1^{VM-j(i)} + \ldots \beta_p^{VM-j} x_p^{VM-j(i)})$ is the latent variable for VM-j.

Therefore, some change in one virtual machine's resource utilization model could lead to re-learning the models of all virtual machines on the same server.

The original regression modeling method for remodeling robustness can be enhanced. First, the modeling can be enhanced to account for the common run-time monitoring data error and noise (e.g., system noise, transient VM migration overhead, etc.) that might add transient perturbation onto otherwise stable resource relationships. The second enhancement recognizes the fact that some relationships (such as the relationship between virtual disk I/O and the corresponding resource overhead) are naturally dynamic due to their content dependence, and re-learning those models should not affect the modeling of other stable relationships.

Since the collocated virtual machines are all involved in the regression model, the number of unknown parameters in β is large. To obtain accurate estimation of those parameters, a significant amount of measurements [x, y] is usually required. However, in the model relearning process, these measurements are not always available due to the quick dynamics of the system. The lack of enough data may lead to the large variances of the final solution β.

Thus, to enhance the robustness of model estimation, a guided regression process may be utilized to solve the model. Some constraints are added to describe the range of possible β values, and those constraints are embedded into the estimation process. The constraints may be derived from various sources (e.g., from the prior model knowledge based on the benchmark profiling, or from the model learned in the previous time period). By including this knowledge to guide the estimation, a more reliable solution can be obtained for the regression model.

The prior constraints on β are represented by a Gaussian distribution with the mean $\bar{\beta}$ and covariance Σ:

$$P(\beta | \sigma^2) = (\sigma^2)^{-K} \exp\left\{ -\frac{1}{2\sigma^2} (\beta - \bar{\beta})^T \sum\nolimits^{-1} (\beta - \bar{\beta}) \right\} \quad (5)$$

The mean $\bar{\beta}$ represents the prior expectation on the values of β. It is determined from the learned β values learned. The covariance Σ represents the confidence of the prior knowledge. Σ is chosen as a diagonal matrix $\Sigma = \text{diag}(c_1, c_2, \ldots, c_p)$, in which the element $c_i$ determines the level of variances of $\beta_i$ in the prior distribution. If the method is confident that the value of $\beta_i$ is located closely around $\bar{\beta}$, the corresponding $c_i$ value is small. Otherwise, large $c_i$ values are chosen to describe the uncertainty of $\beta_i$ values. It should be noted that the least squares method in Equation (3) above solves the regression without any prior knowledge, i.e., the values of $c_i$ are infinity, which may be inaccurate when the number of collected measurements is insufficient.

In accordance with the guided regression, for each parameter $\beta_i$, its prior distribution is determined by $[\bar{\beta}_i, c_i]$. There is also an unknown parameter $\sigma^2$ in Equations (2) and (5) which represents the variance of the data distributions. The inverse-gamma function is used to represent the distribution of $\sigma^2$:

$$P(\sigma^2) = \frac{b^a}{\Gamma(a)} (\sigma^2)^{-(a+1)} \exp\left\{ -\frac{b}{\sigma^2} \right\} \quad (6)$$

where a, b are two parameters to control the shape and scale of the distribution, and Γ(a) is the gamma function of a.

Given the prior distribution P(β), the guided regression finds the solution by maximizing the following posterior distribution:

$$P(\beta | x, y, \sigma^2) \propto P(y | \beta, x) P(\beta | \sigma^2) P(\sigma^2) \quad (7)$$

This leads to the following solution:

$$\beta^* (x^T x + \Sigma^{-1})^{-1} (\Sigma^{-1}\overline{\beta} + x^T x \hat{\beta}) \quad (8)$$

On the right side of Equation 8, the first part $(x^T x + \Sigma^{-1})^{-1}$ is a matrix computed from the measurement data and the covariance matrix $\Sigma$. In the second part of the equation, the solution $\beta^*$ is a weighted average of two components: 1) the prior coefficients $\overline{\beta}$ that are obtained from the mean of prior Gaussian distribution; and 2) the standard least square solution $\hat{\beta}$ which is learned as explained above. The weights of those two components are provided by the prior precision $\Sigma$ and the data matrix $x'x$. Since $\Sigma = \text{diag}(c_1, c_2, \ldots, c_p)$ is chosen, each element $c_i$ determines how the prior knowledge on $\beta_i$ is tradeoff against the estimation from the latest observations. The value of $c_i$ can be tuned to balance the importance between those two components. For instance, by choosing small $c_i$ values, greater posterior weights can be placed on prior expectations in the final model. By utilizing such knowledge to guide the model estimation, a solution is provided which is robust to the number of observations in the model relearning process.

Figure 4:
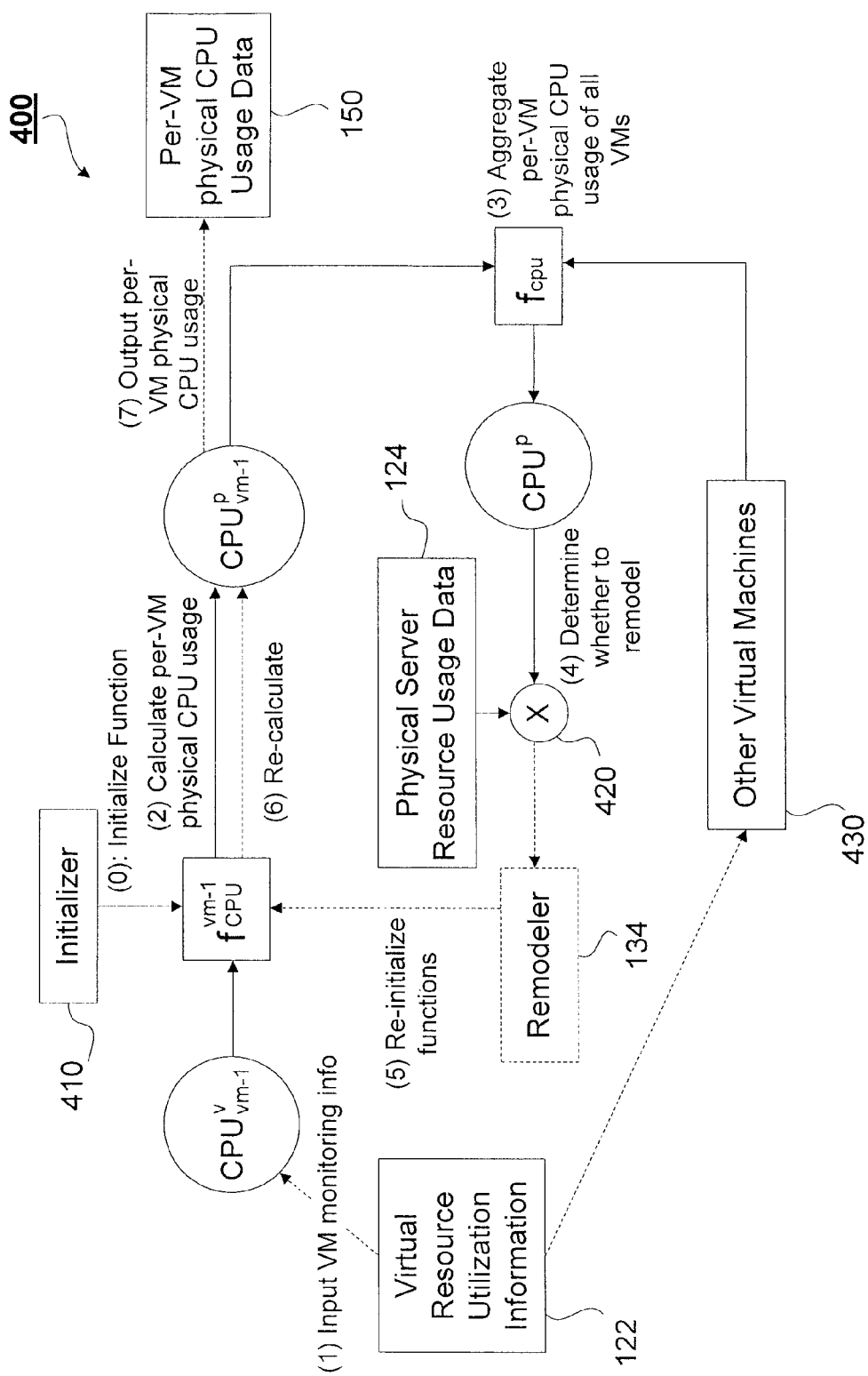
FIG. 4 is block/flow diagram illustrating a method for estimating physical CPU utilization for individual virtual machines in accordance with an embodiment of the present principles.

FIG. 4 is a block/flow diagram illustrating how the method in FIG. 3 can be applied to estimate physical CPU utilization for individual virtual machines executing on a server in accordance with an embodiment of the present principles. In this figure, the physical CPU utilization for a single virtual machine (i.e., VM-1) is computed. It should be recognized that the same process is executed for every other virtual machine (e.g., VM-2, VM-3, etc.) running on the server 110 with VM-1. These additional virtual machines are collectively represented by reference numeral 430.

The method 400 begins when an initializer module 410 initializes the function $$f_{cpu}^{vm-1}.$$

As explained above, me initial parameters can be determined using benchmark-based profiling, or by offline application-specific profiling for calibrated virtual machines.

Next, virtual resource monitoring information 122 collected from the server 110 is input. The virtual resource monitoring information 122 indicates the virtual usage of resources by the virtual machines 112 running on a server 110. Using this information 122, the function $$f_{cpu}^{vm-1}$$

computes the per-VM physical CPU utilization of VM-1 (i.e., $CPU_{vm-1}^P$). Although it is not shown in FIG. 3, the per-VM physical CPU utilization is also calculated for the other virtual machines 430 (e.g., VM-2, VM-3, etc.) as well.

After the physical CPU utilization is calculated for each of the virtual machines 112 executing on the server 110, the function $f_{cpu}$ aggregates this information to estimate the overall physical CPU utilization of the server 110. This aggregated estimate is represented by the node $CPU^P$.

A comparator 420 receives the aggregated estimate $CPU^P$ and compares this information to actual physical server resource usage data 124 collected directly from the server 110. If the difference between the aggregated estimate $CPU^P$ and the physical server resource usage data 124 does not exceed a specified threshold, the method jumps to step (7) and the per-VM physical CPU usage data is output.

On the other hand, if the difference between the aggregated estimate $CPU^P$ and the physical server resource usage data 124 does exceed a threshold, the remodeler 134 is triggered to remodel the DFG 140. Remodeling may include re-initializing the functions (i.e., $$f_{cpu}^{vm-1}, f_{cpu}^{vm-2},$$

etc.) which transform the virtual resource information 122 into per-VM physical resource data 150, and re-calculating the per-VM physical resource data 150 and the aggregated estimate $CPU^P$.

Having described preferred embodiments of a system and method for estimating virtual machine resource utilization information (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for estimating physical resource utilization information for virtual machines, comprising:
    a processor coupled to memory;
    a direct factor graph model indicating how virtual resource activities are transformed into physical resource activities for each virtual machine running on a server, the model being stored on a computer readable storage medium;
    a run-time calibration process to utilize the model to estimate physical resource utilization information for each individual virtual machine on the server based on virtual resource activities measured within those virtual machines, and update the model with a guided regression process upon large estimation discrepancy, wherein the run-time calibration process aggregates the physical resource utilization information to determine aggregated values for each resource, the aggregated values representing total physical usage of a resource by the server;
    a comparator comparison process which is configured to compare the determined aggregated values with physical resource consumption data collected directly from the server to determine whether the model is to be modified, wherein the modifying of the model includes a threshold including the mean and variance of a regression model estimation error from last remodeling process; and
    a remodeling process configured to modify the model using a guided regression process in response to detecting changes in workload patterns of the virtual machines, wherein the remodeling step includes re-initializing function which transform the virtual resource activities into the physical resource activities using benchmark based profiling.

2. The system as recited in claim 1, wherein the model includes a plurality of directed factor sub-graphs, each sub-graph being associated with a particular resource and indicating how virtual resource activities observed within a virtual machine for the particular resource are transformed into physical resource activities.

3. The system as recited in claim 1, wherein the physical resource utilization information at least indicates physical usage of a central processing unit (CPU), memory, disk input/output (I/O), and network for each individual virtual machine on the server.

4. The system as recited in claim 1, wherein remodeling process is triggered to modify the model if a discrepancy between the physical resource consumption data and one or more of the aggregated values exceeds a specified threshold.

5. A method for estimating physical resource utilization information for virtual machines, comprising:
   coupling a processor to memory
   indicating with a direct factor graph model how virtual resource activities are transformed into physical resource activities for each virtual machine running on a server, the model being stored on a computer readable storage medium;
   employing a run-time calibration process to utilize the model to estimate physical resource utilization information for each individual virtual machine on the server based on virtual resource activities measured within those virtual machines, and updating the model with a guided regression process upon large estimation discrepancy, wherein the run-time calibration process aggregates the physical resource utilization information to determine aggregated values for each resource, the aggregated values representing total physical usage of a resource by the server;
   configuring a comparator comparison process to compare the determined aggregated values with physical resource consumption data collected directly from the server to determine whether the model is to be modified, wherein the modifying of the model includes a threshold including the mean and variance of a regression model estimation error from last remodeling process; and
   configuring a remodeling process to modify the model using a guided regression process in response to detecting changes in workload patterns of the virtual machines, wherein the remodeling step includes re-initializing function which transform the virtual resource activities into the physical resource activities using benchmark based profiling.

6. The method as recited in claim 5, wherein the model includes a plurality of directed factor sub-graphs, each sub-graph being associated with a particular resource and indicating how virtual resource activities for the particular resource are transformed into physical resource activities.

7. The method as recited in claim 5, wherein the physical resource utilization information at least indicates physical usage of a central processing unit (CPU), memory disk I/O, and network for each individual virtual machine on the server.

8. The method as recited in claim 5, wherein the remodeling process modifies the model if a discrepancy between the physical resource consumption data and one or more of the aggregated values exceeds a specified threshold.

9. The method of claim 5, further comprising inputting virtual resource utilization information for each virtual machine into the model.

* * * * *